(12) United States Patent
Shoji et al.

(10) Patent No.: US 7,537,860 B2
(45) Date of Patent: May 26, 2009

(54) ALKALINE BATTERY

(75) Inventors: Yasuhiko Shoji, Osaka (JP); Susumu Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 115 days.

(21) Appl. No.: 11/581,343

(22) Filed: Oct. 17, 2006

(65) Prior Publication Data

US 2007/0092788 A1 Apr. 26, 2007

Related U.S. Application Data

(60) Provisional application No. 60/802,155, filed on May 22, 2006.

(30) Foreign Application Priority Data

Oct. 21, 2005 (JP) .............................. 2005-307680

(51) Int. Cl.
  *H01M 2/02* (2006.01)
  *H01M 6/08* (2006.01)
(52) U.S. Cl. ...................... 429/164; 429/167; 429/171; 429/165
(58) Field of Classification Search ................ 429/163, 429/164, 167, 171, 181
See application file for complete search history.

(56) References Cited

U.S. PATENT DOCUMENTS 5,376,467 A * 12/1994 Abe et al. ...................... 429/7

| 6,284,410 | B1 |  | 9/2001 | Durkot et al. |
| 6,703,157 | B1 | * | 3/2004 | Shoji et al. ...................... 429/56 |
| 2004/0197656 | A1 | * | 10/2004 | Durkot et al. ................ 429/229 |
| 2004/0234842 | A1 |  | 11/2004 | Kawano et al. |

FOREIGN PATENT DOCUMENTS

| JP | 09-199106 | 7/1997 |
| JP | 2003-217596 | 7/2003 |

OTHER PUBLICATIONS

European Search Report Issued in corresponding European Patent Application No. 06122197.4, dated on Nov. 22, 2007.

* cited by examiner

*Primary Examiner*—Patrick Ryan
*Assistant Examiner*—Ben Lewis
(74) *Attorney, Agent, or Firm*—McDermott Will & Emery LLP

(57) ABSTRACT

An alkaline battery according to the present invention includes: a power generation element including a positive electrode, a negative electrode, a separator placed between the positive electrode and the negative electrode, and an electrolyte; a positive terminal portion electrically connected to the positive electrode; and a negative terminal portion electrically connected to the negative electrode. The negative electrode contains zinc powder or zinc alloy powder containing 15% by weight or more of particles having a particle size of 75 μm or less as a negative active material. A PTC element is provided in a current path that does not come into contact with the electrolyte at least one of between the positive electrode and the positive terminal portion and between the negative electrode and the negative terminal portion.

4 Claims, 6 Drawing Sheets

F I G. 1
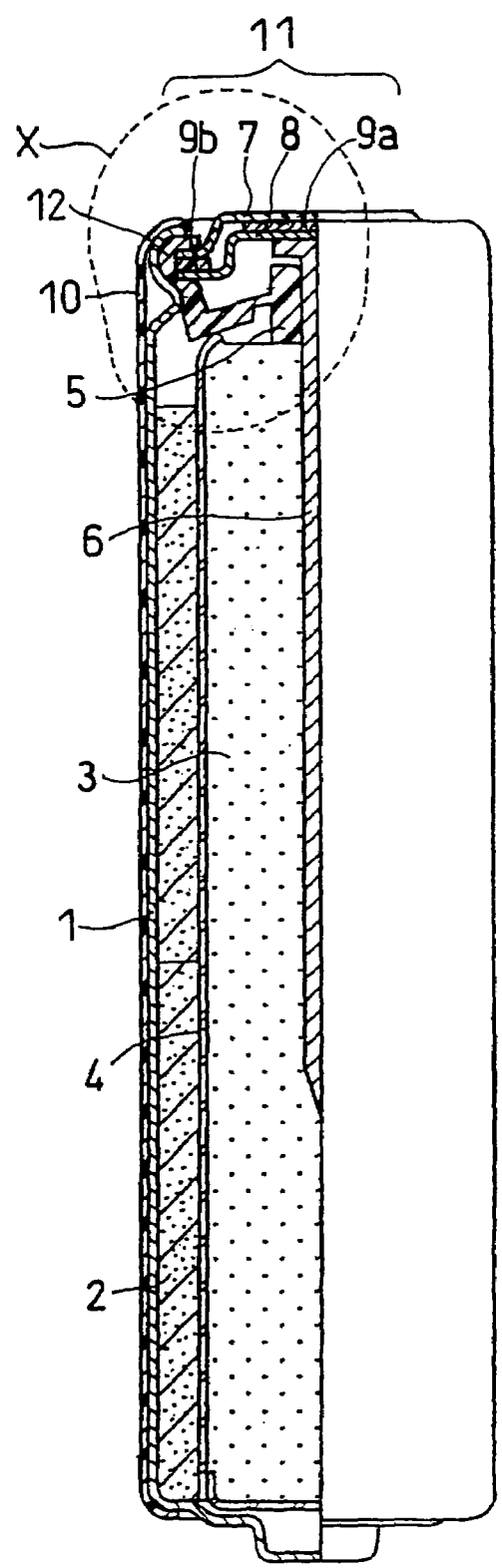

F I G. 5
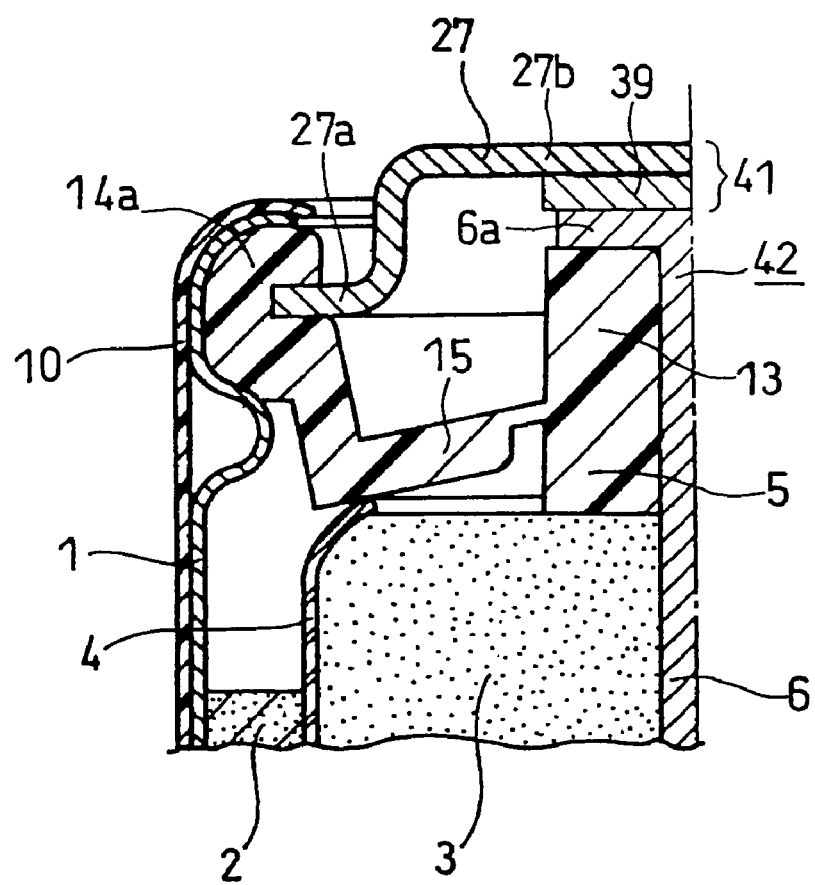

ALKALINE BATTERY

RELATED APPLICATIONS

This application claims priority from Japanese Patent Application No. JP 2005-307680 filed Oct. 21, 2005 and United States Provisional Patent Application No. 60/802,155 filed May 22, 2006 the disclosures of which Applications are incorporated by reference herein. The benefit of the filing and priority dates of the Japanese and United States applications is respectfully requested.

FIELD OF THE INVENTION

The present invention relates to an alkaline battery including a PTC element.

BACKGROUND OF THE INVENTION

In order to improve heavy load discharge characteristics, there has been proposed that zinc powder as a negative active material is pulverized to reduce internal resistance (for example, U.S. Pat. No. 6,284,410). However, this increases reaction efficiency of a negative electrode, and causes a battery to generate intense heat in case of short circuit, and thus the degree of pulverization of zinc powder is limited in practice.

As a method for preventing rapid temperature increase of a battery in case of short circuit, providing a PTC element having a function of blocking a short circuit current in the battery has been considered.

For example, Japanese Patent Laid-Open No. 2003-217596 proposes that a surface of a negative current collector is coated with an electronic conductor mainly composed of polyethylene and having a PTC function. Japanese Patent Laid-Open No. 9-199106 proposes a lithium secondary battery in which a flange of a sealing plate peripheral edge is crimped via a gasket at an opening end of an external can, including a PTC element placed between the flange of the sealing plate and the gasket.

However, in Japanese Patent Laid-Open No. 2003-217596, the electronic conductor coated on the surface of the negative current collector increases contact resistance with an active material to prevent a current collecting effect, which may reduce discharge performance. The electronic conductor is easily decomposed by an alkaline electrolyte, and the PTC function is sometimes insufficiently exerted.

The lithium secondary battery in Japanese Patent Laid-Open No. 9-199106 has a structure of a sealing portion such as a current collector or an explosion-proof mechanism different from a structure in an alkaline battery, and thus an assembling manner of the PTC element suitable for the structure of the alkaline battery needs to be considered.

Thus, in order to solve the conventional problems, the present invention has an object to provide an alkaline battery that has low internal resistance and superior heavy load discharge characteristics, and is high in safety and reliability.

BRIEF SUMMARY OF THE INVENTION

The present invention provides an alkaline battery including: a power generation element including a positive electrode, a negative electrode, a separator placed between the positive electrode and the negative electrode, and an electrolyte; a positive terminal portion electrically connected to the positive electrode; and a negative terminal portion electrically connected to the negative electrode, wherein the negative electrode contains zinc powder or zinc alloy powder containing 15% by weight or more of particles having a particle size of 75 μm or less as a negative active material, and a PTC element is provided in a current path that does not come into contact with the electrolyte at least one of between the positive electrode and the positive terminal portion and between the negative electrode and the negative terminal portion. The "current path that does not come into contact with the electrolyte" means portions that do not come into contact with the electrolyte, and thus includes the positive terminal portion and the negative terminal portion, and do not include the positive electrode and the negative electrode.

The negative electrode preferably contains zinc powder or zinc alloy powder containing 30% by weight or more of particles having a particle size of 75 μm or less.

It is preferable that the alkaline battery further includes: a battery case that houses the power generation element and also serves as the positive terminal portion; and an assembly sealing portion that closes an opening of the battery case, wherein the assembly sealing portion includes the negative terminal portion, a negative current collector electrically connected to the negative terminal portion, and a resin sealing body, the sealing body includes a central cylindrical portion having a through hole through which the negative current collector is inserted, an outer peripheral cylindrical portion placed between a peripheral edge of the negative terminal portion and an opening end of the battery case, and a connecting portion that connects the central cylindrical portion and the outer peripheral cylindrical portion, the opening end of the battery case is bent so as to wrap an upper end of the outer peripheral cylindrical portion of the sealing body, and the bent portion is crimped inward to fasten the peripheral edge of the negative terminal portion, and the negative terminal portion includes the PTC element.

It is preferable that the negative terminal portion includes a first negative terminal plate and a second negative terminal plate spaced apart from each other and each having a flange in a peripheral edge and a flat portion in a central portion, the PTC element placed between the flat portion of the first negative terminal plate and the flat portion of the second negative terminal plate, and an insulation plate placed between the flange of the first negative terminal plate and the flange of the second negative terminal plate, the opening end of the battery case is bent so as to wrap the upper end of the outer peripheral cylindrical portion of the sealing body, and the bent portion is crimped inward to fasten the flange of the first negative terminal plate, the flange of the second negative terminal plate, and the insulation plate.

It is preferable that the negative terminal portion includes a first negative terminal plate and a second negative terminal plate spaced apart from each other and each having a flange in a peripheral edge and a flat portion in a central portion, and a PTC element placed between the flange of the first negative terminal plate and the flange of the second negative terminal plate, the opening end of the battery case is bent so as to wrap the upper end of the outer peripheral cylindrical portion of the sealing body, and the bent portion is crimped inward to fasten the flange of the first negative terminal plate, the flange of the second negative terminal plate, and the PTC element.

It is preferable that the negative terminal portion includes a first negative terminal plate and a second negative terminal plate spaced apart from each other and each having a flange in a peripheral edge and a flat portion in a central portion, and the PTC element placed on the flat portion of the second negative terminal plate, the flat portion of the second negative terminal plate and the PTC element have, in the centers, through holes through which the negative current collector is inserted, the second negative terminal plate and the PTC element are placed between a head of the negative current collector and the central cylindrical portion, the PTC element is placed between the head of the negative current collector and the flat portion of the second negative terminal plate, the opening end of the battery case is bent so as to wrap the upper end of the outer peripheral cylindrical portion of the sealing body, and the bent portion is crimped inward to fasten the flange of the first negative terminal portion and the flange of the second negative terminal plate.

It is preferable that the negative terminal portion includes a negative terminal plate having a flange in a peripheral edge and a flat portion in a central portion, and the PTC element placed on the flat portion of the negative terminal plate, the PTC element is placed between a head of the negative current collector and the flat portion of the negative terminal plate, the opening end of the battery case is bent so as to wrap the upper end of the outer peripheral cylindrical portion of the sealing body, and the bent portion is crimped inward to fasten the flange of the negative terminal portion.

According to the present invention, providing the PTC element in the battery can prevent rapid temperature increase of the battery in case of short circuit even if the fine particle content of the zinc powder is increased. Specifically, the PTC element is integrated in the current path that does not come into contact with the alkaline electrolyte between the negative electrode and the negative terminal portion and between the positive electrode and the positive terminal portion, and thus rapid temperature increase of the battery in case of short circuit can be prevented, and tolerance can be increased with minimum reduction of the fine particle content of the zinc powder. Then, internal resistance of the battery is reduced to obtain superior heavy load discharge characteristics. This provides an alkaline battery that is high in safety for a long period and has high output.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWINGS

FIG. 1 is a front view, partially in section, of an alkaline battery in Embodiment 1 of the present invention;

FIG. 5 is a vertical sectional view of a sealing portion in Embodiment 4 of the present invention.

DETAILED DESCRIPTION OF THE INVENTION

Figure 2:
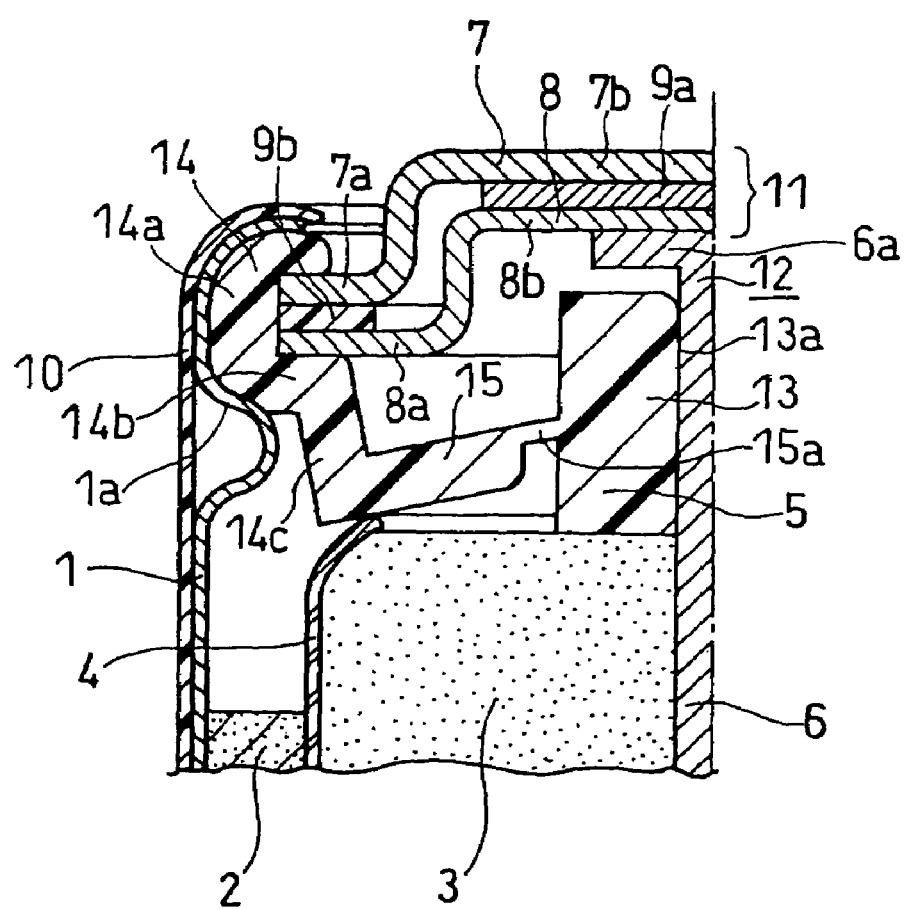
FIG. 2 is an enlarged vertical sectional view of a sealing portion (an X portion)) in FIG. 1.

As described above, it has been known that pulverization of zinc powder reduces internal resistance and improves heavy load discharge characteristics, but the pulverization of zinc powder has a problem in safety because of a large amount of heat generated by a battery in case of short circuit.

Thus, in order to simultaneously achieve improvement in heavy load discharge characteristics by pulverization of zinc powder and improvement in safety, the inventors have conducted various studies on an assembling manner of a PTC element into an alkaline battery and the degree of pulverization of zinc powder to optimize a placement position of the PTC element and a form of a particle of the zinc powder.

As a result, the inventors have found that when the PTC element is provided in a current path that does not come into contact with an alkaline electrolyte between a negative electrode and a negative terminal portion and between a positive electrode and a positive terminal portion, and zinc powder or zinc alloy powder used as a negative active material contains 15% by weight or more of particles having a particle size of 75 $\mu$m or less, rapid temperature increase of a battery in case of external short circuit can be sufficiently prevented, internal resistance is reduced, and improvement in heavy load discharge characteristics and improvement in safety of the battery can be simultaneously achieved.

Specifically, the present invention relates to an alkaline battery including: a power generation element including a positive electrode, a negative electrode, a separator placed between the positive electrode and the negative electrode, and an electrolyte; a positive terminal portion electrically connected to the positive electrode; and a negative terminal portion electrically connected to the negative electrode. The present invention has a feature in that the negative electrode contains zinc powder or zinc alloy powder containing 15% by weight or more of particles having a particle size of 75 $\mu$m or less as a negative active material, and a PTC element is provided in a current path that does not come into contact with the electrolyte at least one of between the positive electrode and the positive terminal portion and between the negative electrode and the negative terminal portion.

Thus, increase in internal resistance by providing the PTC element is prevented by pulverization of the zinc powder or zinc alloy powder, and rapid temperature increase of the battery in case of external short circuit by the pulverization of the zinc powder or zinc alloy powder is prevented by providing the PTC element. The PTC element is provided in the current path that does not come into contact with the electrolyte, thereby preventing the PTC element from degraded by the electrolyte.

The zinc powder or zinc alloy powder preferably contains 30% by weight or more of particles having a particle size of 75 $\mu$m or less.

The zinc powder containing 15% by weight or more of particles having a particle size of 75 $\mu$m or less can be obtained by the following method. Zinc is heated to about 500° C. and melted, and then dropped in a thin flow, and compressed air is injected to the melted zinc to be sprayed to obtain zinc powder. The zinc powder is classified by sieve with an aperture of 75 $\mu$m and sieve with an aperture of 425 $\mu$m. Then, a predetermined weight of particles having a particle size of 75 $\mu$m or less are mixed with particles screened between 75 $\mu$m and 425 $\mu$m.

Screening the zinc powder by the sieve with an aperture of 75 $\mu$m and weighing the powder allows checking that the zinc powder contains 15% by weight or more of particles having a particle size of 75 $\mu$m or less.

The alkaline battery further includes, for example, a battery case that houses the power generation element, and an assembly sealing portion that closes an opening of the battery case. The assembly sealing portion includes the negative terminal portion, a negative current collector electrically connected to the negative terminal portion, and a resin sealing body. The sealing body includes a central cylindrical portion having a through hole through which the negative current collector is inserted, an outer peripheral cylindrical portion placed between a peripheral edge of the negative terminal portion and an opening end of the battery case, and a connecting portion that connects the central cylindrical portion and the outer peripheral cylindrical portion. The opening end of the battery case is bent so as to wrap an upper end of the outer peripheral cylindrical portion of the sealing body, the bent portion is crimped inward to fasten the peripheral edge of the negative terminal portion, and the negative terminal portion includes the PTC element.

In the alkaline battery, the positive terminal portion is placed, for example, in a bottom of the battery case, and the positive terminal portion includes the PTC element.

Now, preferred embodiments of the battery in which including the PTC element will be described.

EMBODIMENT 1

An embodiment of the present invention will be described with reference to FIGS. 1 and 2.

FIG. 1 is a front view, partially in section, of an AA alkaline battery (LR6) according to an embodiment of the present invention.

A hollow cylindrical positive electrode mixture 2 is inscribed in a closed-end cylindrical battery case 1 that also serves as a positive terminal. In a hollow portion of the positive electrode mixture 2, a gel negative electrode 3 is placed via a closed-end cylindrical separator 4. The positive electrode mixture 2, the separator 4, and the gel negative electrode 3 contain an alkaline electrolyte. Nonwoven fabric mainly composed of, for example, polyvinyl alcohol fiber and rayon fiber mixed is used as the separator 4.

The positive electrode mixture 2 includes, for example, a positive active material containing manganese dioxide powder, nickel oxyhydroxide powder or a mixture thereof, a conductive agent such as graphite powder, or a mixture of an alkaline electrolyte such as an aqueous potassium hydroxide solution.

The gel negative electrode 3 includes, for example, a negative active material such as zinc powder or zinc alloy powder, a gelling agent such as sodium polyacrylate, and a mixture of an alkaline electrolyte such as an aqueous potassium hydroxide solution. The zinc alloy powder highly resistant to corrosion is preferably used as the negative active material, and in an environmentally friendly manner, the zinc alloy powder does not contain any or all of mercury, cadmium, and lead. The zinc alloy includes a zinc alloy containing, for example, indium, aluminum, and bismuth.

FIG. 2 is an enlarged sectional view of a portion X (a sealing portion of the alkaline battery) in FIG. 1.

The battery case 1 houses a power generation element such as the positive electrode mixture 2 and is then provided with a step 1a near an opening, and the opening of the battery case 1 is sealed by an assembly sealing portion 12. The assembly sealing portion 12 includes a negative terminal portion 11, a negative current collector 6 electrically connected to the negative terminal portion 11, and a resin sealing body 5. The negative current collector 6 is inserted in the center of the gel negative electrode 3.

The sealing body 5 includes a central cylindrical portion 13 having a through hole 13a through which the negative current collector 6 is inserted, an outer peripheral cylindrical portion 14 placed between a peripheral edge of the negative terminal portion 11 and an opening end of the battery case 1, and a connecting portion 15 connecting the central cylindrical portion 13 and the outer peripheral cylindrical portion 14 and having a thin portion 15a that serves as a safety valve. The outer peripheral cylindrical portion 14 includes an annular horizontal portion 14b that receives the peripheral edge of the negative terminal portion 11, an upper cylindrical portion 14a raised upward from an outer peripheral edge of the horizontal portion 14b, and a lower cylindrical portion 14c extending downward from an inner peripheral edge of the horizontal portion 14b in a slanting direction. The opening end of the battery case 1 is bent so as to wrap an upper end of the upper cylindrical portion 14a of the sealing body 5, and the bent portion is crimped inward to fasten the peripheral edge of the negative terminal portion 11 with the step 1a. An outer surface of the battery case 1 is coated with an external label 10.

The present invention has a feature in a structure of the negative terminal portion 11 in the assembly sealing portion 12 of the alkaline battery. The negative terminal portion 11 includes a first negative terminal plate 7 and a second negative terminal plate 8 placed apart from each other, and a PTC element 9a placed between the first negative terminal plate 7 and the second negative terminal plate 8.

Specifically, as shown in FIG. 2, the first negative terminal plate 7 has a flange 7a in a peripheral edge and a flat portion 7b in a central portion, and the second negative terminal plate 8 has a flange 8a in a peripheral edge and a flat portion 8b in a central portion. The PTC element 9a is placed between the flat portion 7b of the first negative terminal plate 7 and the flat portion 8b of the second negative terminal plate 8, and an insulation plate 9b is placed between the flange 7a of the first negative terminal plate 7 and the flange 8a of the second negative terminal plate 8. The opening end of the battery case 1 is bent so as to wrap an upper end of the outer peripheral cylindrical portion 14 of the sealing body 5, and the bent portion is crimped inward to fasten the flange 7a of the first negative terminal plate 7, the flange 8a of the second negative terminal plate 8, and the insulation plate 9b. The negative current collector 6 is physically and electrically connected by welding a head 6a thereof to the flat portion 8b of the second negative terminal plate 8. The PTC element 9a has a function of rapidly increasing resistance when reaching predetermined temperature.

The disk-shaped PTC element 9a has, for example, a thickness of 0.2 to 0.4 mm and a diameter of 5 to 7.5 mm.

The ring-shaped insulation plate 9b has, for example, a thickness of 0.2 to 0.4 mm, an inner diameter of 5 to 8 mm, and an outer diameter of 11 to 12 mm.

In order to ensure prevention of a phenomenon in which the first negative terminal plate 7 and the second negative terminal plate 8 come into direct contact with each other to cause a current to pass without the PTC element 9a, and the PTC element does not function and cannot block the current, the first negative terminal plate 7 and the second negative terminal plate 8 are preferably placed so that a boundary between the flange 7a and the flat portion 7b of the first negative terminal plate 7, and a boundary between the flange 8a and the flat portion 8b of the second negative terminal plate 8 are spaced 0.2 to 1 mm apart.

In the alkaline battery, a current path between the first negative terminal plate 7 and the second negative terminal plate 8 is constituted by the PTC element 9a only as described above. Thus, when the battery is externally short-circuited to cause a short circuit current to pass and cause battery temperature to reach predetermined temperature, resistance of the PTC element 9a is increased to ensure reduction in the short circuit current. Specifically, rapid temperature increase of the battery in case of short circuit can be prevented. The PTC element is made of, for example, a material commercially available under the trade name of Polyswitch produced by Tyco Electronics Raychem.

As shown in FIG. 2, the negative terminal portion 11 is constituted by two negative terminal plates 7 and 8, which increases a length of a rising path of the electrolyte, and causes the path to be easily separated, thereby preventing leakage of the electrolyte.

The insulation plate 9b is made of, for example, paper or resin such as polypropylene.

The first negative terminal plate 7 is made of, for example, nickel-plated steel sheet.

The second negative terminal plate 8 is preferably made of tin-plated steel sheet or nickel-plated steel sheet in terms of low contact resistance.

The first and second negative terminal plates 7 and 8 have holes (not shown) for discharging gas out of the battery, for example, in the boundary between the flange 7a and the flat portion 7b and the boundary between the flange 8a and the flat portion 8b. When internal pressure of the battery is abnormally increased, the thin portion 15a of the sealing body 5 is broken to discharge the gas out of the holes.

EMBODIMENT 2

Figure 3:
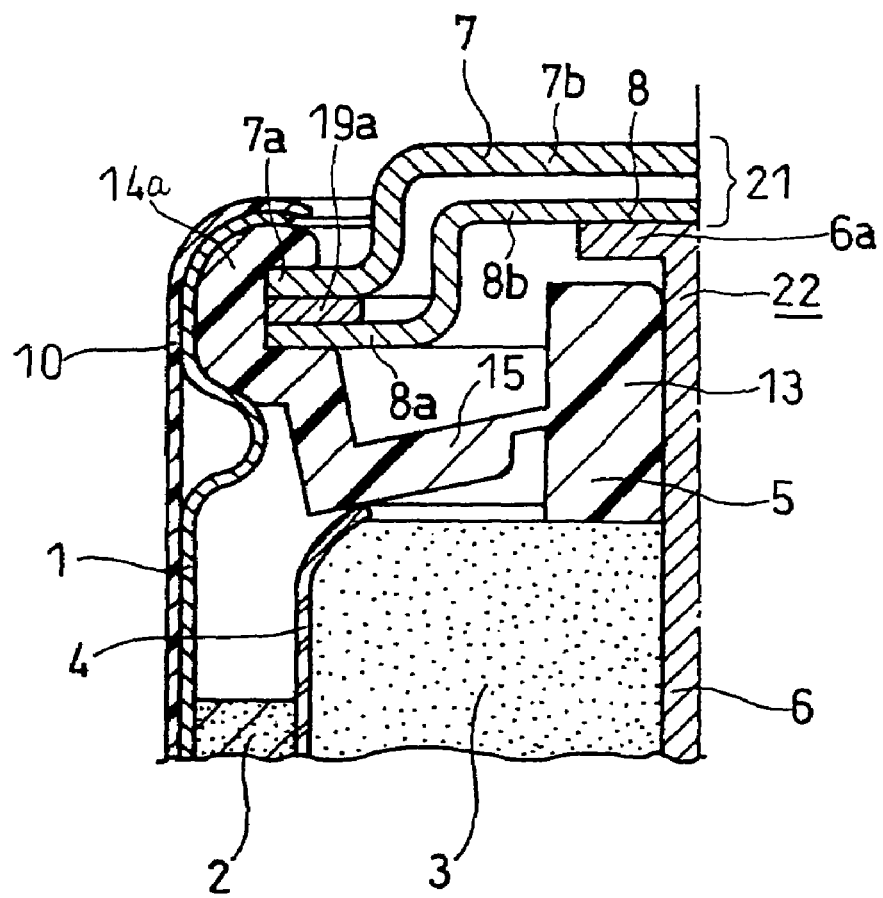
FIG. 3 is a vertical sectional view of a sealing portion in Embodiment 2 of the present invention.

A sealing portion of this embodiment is shown in FIG. 3. A negative terminal portion 21 in an assembly sealing portion 22 includes a first negative terminal plate 7 and a second negative terminal plate 8 spaced apart from each other, and a ring-shaped PTC element 19a placed between a flange 7a of the first negative terminal plate 7 and a flange 8a of the second negative terminal plate 8. An opening end of the battery case 1 is bent so as to wrap an upper end of an upper cylindrical portion 14a of a sealing body 5, and the bent portion is crimped inward to fasten the flange 7a of the first negative terminal plate 7, the flange 8a of the second negative terminal plate 8, and the PTC element 19a. This fastening allows low electrical contact resistance between the PTC element 19a and the negative terminal plates 7 and 8 to be maintained. An insulation plate may be placed between a flat portion 7b of the first negative terminal plate 7 and a flat portion 8b of the second negative terminal plate 8.

The ring-shaped PTC element 19a has, for example, a thickness of 0.2 to 0.4 mm, an inner diameter of 5 to 8 mm, and an outer diameter of 11 to 12 mm.

In order to ensure prevention of a phenomenon in which the first negative terminal plate 7 and the second negative terminal plate 8 come into direct contact with each other to cause a current to pass without the PTC element 19a, and the PTC element does not function and cannot block the current, the first negative terminal plate 7 and the second negative terminal plate 8 are preferably placed so that the flat portion 7b and the flat portion 8b are spaced 0.2 to 1 mm apart.

EMBODIMENT 3

Figure 4:
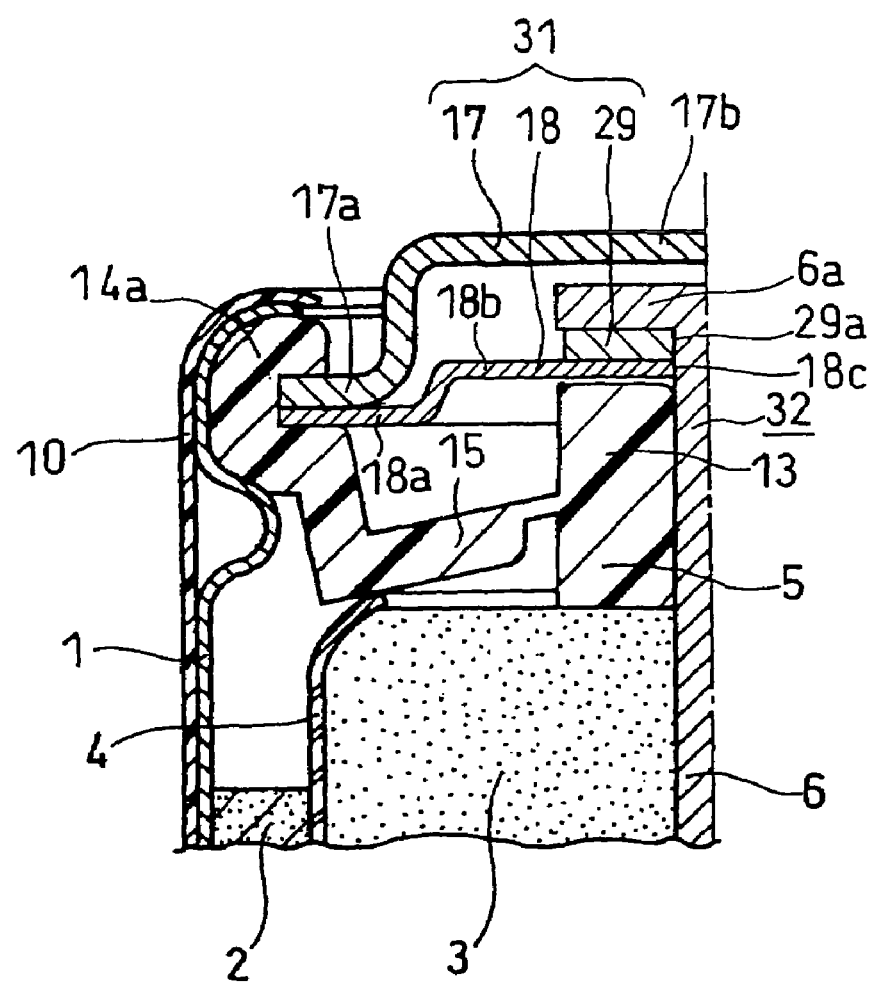
FIG. 4 is a vertical sectional view of a sealing portion in Embodiment 3 of the present invention.

A sealing portion of this embodiment is shown in FIG. 4. A negative terminal portion 31 in an assembly sealing portion 32 includes a first negative terminal plate 17 and a second negative terminal plate 18 spaced apart from each other and having flanges 17a and 18a in peripheral edges and flat portions 17b and 18b in central portions, and a PTC element 29 provided on a flat portion 18b of the second negative terminal plate 18.

The flat portion 18b of the second negative terminal plate 18 and the PTC element 29 have, in the centers, through holes 18c and 29a through which a negative current collector 6 is inserted. The second negative terminal plate 18 and the ring-shaped PTC element 29 are placed between a head 6a of the negative current collector 6 and a central cylindrical portion 13 of the sealing body 5. An opening end of the battery case 1 is bent so as to wrap an upper end of an upper cylindrical portion 14a of a sealing body 5, and the bent portion is crimped inward to fasten the flange 17a of the first negative terminal plate 17 and the flange 18a of the second negative terminal plate 18. A space is provided between the head 6a of the negative current collector 6 and the flat portion 17b of the first negative terminal plate 17 and an insulation plate may be placed in the space.

The disk-shaped PTC element 29 has, for example, a thickness of 0.2 to 0.4 mm and a diameter of 4 to 7 mm, and the through hole 29a in the center has a diameter of 1.3 to 2.0 mm.

In order to ensure prevention of a phenomenon in which the first negative terminal plate 17 and the negative current collector 6 come into contact with each other to cause a current to pass without the PTC element 29a, and the PTC element does not function and cannot block the current, the first negative terminal plate 17 and the negative current collector 6 are preferably placed so that the flat portion 17b and the head 6a are spaced 0.2 to 1 mm apart.

EMBODIMENT 4

A sealing portion of this embodiment is shown in FIG. 5. A negative terminal portion 41 in an assembly sealing portion 42 includes a negative terminal plate 27 having a flange 27a in a peripheral edge and a flat portion 27b in a central portion, and a disk-shaped PTC element 39 placed on the flat portion 27b of the negative terminal plate 27. The PTC element 39 is placed between a head 6a of a negative current collector 6 and the flat portion 27b of the negative terminal plate 27. An opening end of the battery case 1 is bent so as to wrap an upper end of an upper cylindrical portion 14a of a sealing body 5, and the bent portion is crimped inward to fasten the flange 27a of the negative terminal plate 27.

The disk-shaped PTC element 39 has, for example, a thickness of 0.2 to 0.4 mm, and a diameter of 4 to 7 mm.

In the above described embodiments, the PTC element is provided in the negative terminal portion, but the PTC element may be provided in the positive terminal portion. For example, instead of the battery case 1 that also serves as a positive terminal, a closed-end cylindrical battery case that does not serve as a positive terminal, and a positive terminal portion including a positive terminal plate and a PTC element placed on a surface opposite to a terminal surface of the positive terminal plate may be used, and the positive terminal portion may be placed in a bottom surface of the battery case so that the PTC element is placed between the battery case and the positive terminal plate.

Now, examples of the present invention will be described in detail, but the present invention is not limited to the examples.

EXAMPLE (1) Preparation of Positive Electrode Mixture

Manganese dioxide powder (having a mean particle size of 15 μm) and graphite powder (having a mean particle size of 35 μm) were mixed at the weight ratio of 90:10. Then, the mixture and 36% by weight of aqueous potassium hydroxide solution as an alkaline electrolyte were mixed at the weight ratio of 100:3, sufficiently stirred, and then compressed and formed into flakes. Then, the flake positive electrode mixture was ground into granules, the granules were classified by a sieve, and granules of 10 to 100 mesh were pressurized and formed into a hollow cylindrical shape to obtain a pellet positive electrode mixture.

(2) Preparation of Gel Negative Electrode

Sodium polyacrylate as a gelling agent, 36% by weight of aqueous potassium hydroxide solution as an alkaline electrolyte, and a negative active material were mixed at the weight ratio of 1:33:66 to obtain a gel negative electrode. As the negative active material, zinc alloy powder (having a mean particle size of 135 μm) was used containing 0.025% by weight of indium, 0.015% by weight of bismuth, and 0.004% by weight of aluminum, and containing no mercury and lead.

(3) Assembly of Cylindrical Alkaline Battery

An AA alkaline battery (LR6) having the structure in FIG. 1 was prepared by the following procedure. FIG. 1 is a front view, partially in section, of a cylindrical alkaline battery. FIG. 2 is an enlarged sectional view of a portion X (a sealing portion) in FIG. 1.

Two positive electrode mixtures 2 obtained from above were inserted into the battery case 1, the positive electrode mixtures 2 were pressurized by a pressure jig and brought into tight contact with an inner wall of the battery case 1. A closed-end cylindrical separator 4 was placed in the center of the positive electrode mixtures 2 in tight contact with the inner wall the battery case 1. A predetermined amount of aqueous solution containing 36% by weight of potassium hydroxide as an alkaline electrolyte was injected inside the separator 4. After the lapse of predetermined time, the gel negative electrode 3 obtained from above was charged into the separator 4. Nonwoven fabric mainly composed of polyvinyl alcohol fiber and rayon fiber mixed was used as the separator 4.

Next, the battery case 1 housing a power generation element such as the positive electrode mixture 2 was sealed as described below using an assembly sealing portion 12.

A head 6a of a negative current collector 6 and a flat portion 8b of a second negative terminal plate 8 made of a 0.2 mm thick tin-plated steel sheet were electrically welded, and the negative current collector 6 was inserted through a through hole 13a in a central cylindrical portion 13 of a nylon sealing body 5 to obtain an intermediate of the assembly sealing portion.

The battery case 1 was formed with a groove near an opening thereof to form a step 1a, and the intermediate was placed in the opening of the battery case 1 so that a horizontal portion 14b of the intermediate was received on the step 1a. At this time, part of the negative current collector 6 was inserted into the gel negative electrode 3. Then, a ring-shaped insulation plate 9b (having a thickness of 0.3 mm, an inner diameter of 8 mm, and an outer diameter of 11 m) made of polypropylene was placed on a flange 8a of the second negative terminal plate 8 of the intermediate. A disk-shaped PTC element 9a (Polyswitch produced by Tyco Electronics Raychem) having a thickness of 0.3 mm and a diameter of 7.2 mm was placed on the flat portion 8b of the second negative terminal plate 8 of the intermediate. Further, a first negative terminal plate 7 made of a 0.4 mm thick nickel-plated steel sheet was placed on the PTC element 9a and the insulation plate 9b so that the flat portion 7b corresponds to the PTC element 9a and the flange 7a corresponds to the insulation plate 9b. The resistance of the PTC element 9a is 0.03 Ω at 20° C., but significantly increased to $10^4$ Ω at high temperature of 120° C.

Thus, a negative terminal portion 11 was configured in which the PTC element 9a was placed between the flat portion 7b of the first negative terminal plate 7 and the flat portion 8b of the second negative terminal plate 8, and the insulation plate 9b was placed between the flange 7a of the first negative terminal plate and the flange 8a of the second negative terminal plate 8. Then, an opening end of the battery case 1 was bent to wrap an upper end of an upper cylindrical portion 14a of a sealing body 5, and the bent portion was crimped to fasten a peripheral edge of the negative terminal portion 11 by the opening end of the battery case 1 via an outer peripheral cylindrical portion 14 to seal the opening of the battery case 1. Thus, the opening of the battery case 1 was closed by the assembly sealing portion 12 (assembly sealing portion A) including the negative terminal portion 11, the sealing body 5, and the negative current collector 6. An outer surface of the battery case 1 was coated with an external label 10.

Besides the assembly sealing portion A, the following assembly sealing portions B to F were prepared.

(4) Preparation of Assembly Sealing Portion B

An assembly sealing portion 22 (assembly sealing portion B) shown in FIG. 3 was prepared in the same manner as the assembly sealing portion A except that a ring-shaped PTC element 19a (having a thickness of 0.3 mm, an outer diameter of 11 mm, and an inner diameter of 8 mm) as in Example 1 is placed between a flange 7a of a first negative terminal plate 7 and a flange 8a of a second negative terminal plate 8, and a negative terminal portion 21 using no insulation plate was configured.

(5) Preparation of Assembly Sealing Portion C

A negative current collector 6 was inserted through a sealing body 5, a second negative terminal plate 18, and a through hole 29a in a disk-shaped PTC element 29 (having a thickness of 0.3 mm, an outer diameter of 5 mm, and a hole diameter of 1.5 mm) to obtain an intermediate of an assembly sealing portion. At this time, the second negative terminal plate 18 and the PTC element 29 were placed between a head 6a of the negative current collector 6 and a central cylindrical portion 13 of the sealing body 5. After the intermediate was placed in an opening of a battery case 1, a first negative terminal plate 17 was placed on the second negative terminal plate 18 so that a flange 17a of the first negative terminal plate 17 and a flange 18a of the second negative terminal plate 18 come into contact with each other and a flat portion 17b of the first negative terminal plate 17 does not come into contact with the head of the negative current collector 6 to prepare an assembly sealing portion 32 (assembly sealing portion C) as in FIG. 4.

(6) Preparation of Assembly Sealing Portion D

A negative current collector 6 was inserted through a through hole 13a of a sealing body 5, a head 6a of the negative current collector 6 was brought into electrical contact with a flat portion 27b of a negative convector plate 27 via a disk-shaped PTC element 39 (having a thickness of 0.3 mm and an outer diameter of 5 mm) to prepare an assembly sealing portion 42 (assembly sealing portion D) as in FIG. 5.

(7) Preparation of Assembly Sealing Portion E

Figure 6:
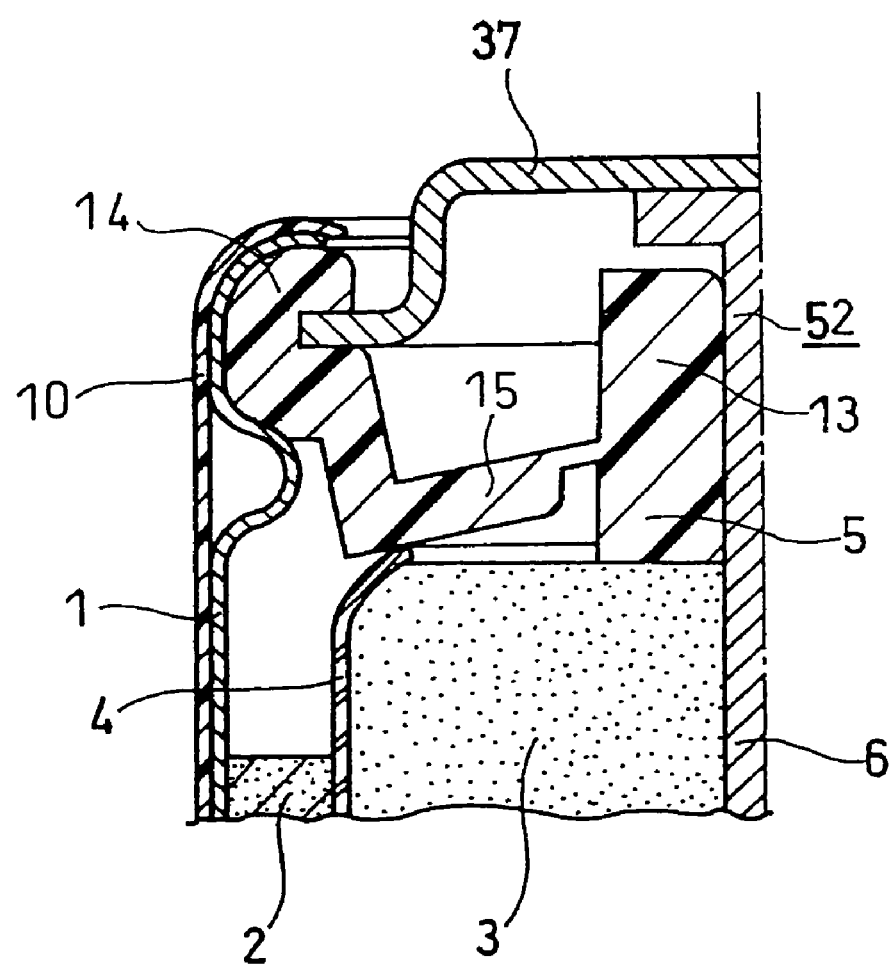
FIG. 6 is a vertical sectional view of a sealing portion of a conventional alkaline battery.

A negative terminal portion was constituted by a first negative terminal plate 37 only to prepare an assembly sealing portion 52 (assembly sealing portion E) in FIG. 6 corresponding to the intermediate of the assembly sealing portion A.

(8) Preparation of Assembly Sealing Portion F

Ninety parts by weight of powder of electronically conductive material having a PTC function and mainly composed of polyethylene having a conductivity of 5 S/cm at room temperature, and a conductivity of 5 μS/cm at 120° C. (operation temperature), and 10 parts by weight of polyvinylidene fluoride as a binder were dispersed in N-methylpyrrolidinone to obtain paste. A head 6a of a negative current collector 6 and a flat portion 17b of a first negative terminal plate 17 were welded, then the paste was applied on the entire surface of the negative current collector 6, and dried at 60° C. for 12 hours. An assembly sealing portion F was prepared in the same manner as the assembly sealing portion E except using the negative current collector.

In preparation of the alkaline battery, zinc alloy powders A to D having different forms were prepared by changing the percentage of particles having a particle size of 75 μm or less to the total weight of zinc alloy powder used as a negative active material to 5% by weight, 15% by weight, 30% by weight, and 50% by weight. The zinc alloy powders A to D were obtained by classifying the zinc alloy powder with sieve of an aperture of 75 μm and with sieve of an aperture of 425 μm, and mixing a predetermined weight of particles having a particle size of 75 μm or less with particles screened between 75 μm and 425 μm.

Then, the assembly sealing portions A to F and the zinc alloy powders A to D as the negative active material were combined in various manners to prepare alkaline batteries.

[Evaluations]

(9) Evaluation of Heavy Load Discharge Characteristics

A discharge test to discharge at 1500 mW for two seconds and then discharge at 650 mW for 28 seconds was repeatedly conducted 10 times (for five minutes) every hour, and the number of cycles at the time of reaching an end voltage of 1.05 V was checked. It was determined that heavy load discharge characteristics were satisfactory when the number of cycles was 80 or more.

(10) Short Circuit Test of Battery

For each of the batteries obtained from above, a battery case and a first negative terminal plate were connected by a 0.1 mm thick nickel lead to externally short-circuit the battery. Surface temperature of a battery barrel was measured by a thermocouple to check the maximum temperature on the surface of the battery. It was determined that a current blocking function of a PTC element was satisfactorily exerted when the temperature on the surface of the battery was 90° C. or less. If the temperature of the battery exceeds 90° C., liquid leakage caused by heating of the battery or increase in internal pressure may damage peripheral equipment used.

(11) Measurement of Internal Resistance of Battery

For each of the batteries obtained from above, a voltage across terminals when an AC current of 1 kHz was passed through the battery was measured by DIGITAL MILLIOHM METER VP-2811A produced by Matsushita Communications Industrial Co., Ltd. to check internal resistance of the battery.

The evaluation results are shown in Table 1. Combinations of the assembly sealing portion E and the zinc alloy powders A to D, and combinations of the assembly sealing portions A to D and F and the zinc alloy powder A in Table 1 are comparative examples. Combinations of the assembly sealing portions A to D and the zinc alloy powders B to D are examples. In Table 1, an upper row represents internal resistance, a middle row represents the maximum temperature of the battery in case of external short circuit, and a lower row represents the number of cycles at the time of heavy load discharge.

TABLE 1

| | | Zinc alloy powder | | | |
|---|---|---|---|---|---|
| | | A | B | C | D |
| Assembly sealing portion | E | 0.125 Ω<br>127° C.<br>82 Cycle | 0.117 Ω<br>135° C.<br>91 Cycle | 0.101 Ω<br>143° C.<br>98 Cycle | 0.092 Ω<br>152° C.<br>112 Cycle |
| | F | 0.169 Ω<br>81° C.<br>32 Cycle | — | — | — |

TABLE 1-continued

| | | Zinc alloy powder | | | |
|---|---|---|---|---|---|
| | | A | B | C | D |
| | A | 0.136 Ω<br>82° C.<br>75 Cycle | 0.125 Ω<br>86° C.<br>83 Cycle | 0.111 Ω<br>82° C.<br>93 Cycle | 0.099 Ω<br>87° C.<br>105 Cycle |
| | B | 0.138 Ω<br>89° C.<br>74 Cycle | 0.127 Ω<br>82° C.<br>82 Cycle | 0.115 Ω<br>85° C.<br>90 Cycle | 0.101 Ω<br>86° C.<br>99 Cycle |
| | C | 0.146 Ω<br>87° C.<br>71 Cycle | 0.134 Ω<br>85° C.<br>80 Cycle | 0.126 Ω<br>85° C.<br>87 Cycle | 0.105 Ω<br>88° C.<br>95 Cycle |
| | D | 0.143 Ω<br>85° C.<br>73 Cycle | 0.130 Ω<br>86° C.<br>82 Cycle | 0.120 Ω<br>82° C.<br>90 Cycle | 0.107 Ω<br>88° C.<br>101 Cycle |

For batteries of the comparative examples using the assembly sealing portion E, increase in pulverized zinc alloy powder reduced internal resistance to obtain satisfactory heavy load discharge characteristics, but an amount of heat generated by the batteries was increased in case of external short circuit.

For batteries of the comparative examples using the assembly sealing portion F, an amount of heat generated by the batteries in case of external short circuit was significantly reduced, but internal resistance was increased and heavy load discharge characteristics were significantly reduced. The same short circuit test was conducted after the batteries were kept at room temperature for three months, and the result was that the maximum temperature of the batteries in case of short circuit was 125° C. and the battery temperature was significantly increased. This is because the PTC element is placed in contact with an electrolyte in a power generation element, and an electronic conductor having a PTC function provided on a surface of a negative current collector is decomposed by the contact with the alkaline electrolyte during keeping to prevent exertion of the PTC function.

For batteries of the comparative examples using the zinc alloy powder A, the function of the PTC element included significantly reduced an amount of heat generated by the batteries in case of external short circuit, but internal resistance was increased and heavy load discharge characteristics were reduced.

On the other hand, for batteries of the examples of the present invention including the combinations of the assembly sealing portions A to D and the zinc alloy powders B to D, an amount of heat generated by the batteries in case of external short circuit was significantly reduced, increase in internal resistance was minimized, and satisfactory heavy load discharge characteristics were obtained. Particularly, for the batteries including the combinations of the assembly sealing portions A to D and the zinc alloy powder C or D, an amount of heat generated by the batteries in case of external short circuit was further reduced, and heavy load discharge characteristics were improved.

The alkaline battery according to the present invention has high reliability and is suitably used for power supplies of electronic equipment or portable equipment or the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An alkaline battery comprising:
   a power generation element including a positive electrode, a negative electrode, a separator placed between the positive electrode and the negative electrode, and an electrolyte;
   a positive terminal portion electrically connected to said positive electrode;
   a negative terminal portion electrically connected to said negative electrode;
   a battery case that houses said power generation element and also serves as said positive terminal portion; and
   an assembly sealing portion that closes an opening of said battery case,
   wherein said negative electrode contains zinc powder or zinc alloy powder containing 15% by weight or more of particles having a particle size of 75 μm or less as a negative active material, and
   wherein said assembly sealing portion includes the negative terminal portion, a negative current collector electrically connected to said negative terminal portion, and a resin sealing body,
   said sealing body includes a central cylindrical portion having a through hole through which said negative current collector is inserted, an outer peripheral cylindrical portion placed between a peripheral edge of said negative terminal portion and an opening end of said battery case, and a connecting portion that connects said central cylindrical portion and said outer peripheral cylindrical portion,
   said connecting portion has a thin portion serving as a safety valve; and
   said negative terminal portion comprises a first negative terminal plate and a second negative terminal plate spaced apart from each other, and a PTC element placed between said first negative terminal plate and said second negative terminal plate,
   wherein said first negative terminal plate and second negative terminal plate each have a flange in a peripheral edge, a flat portion in a central portion, and a boundary portion between said flange and said flat portion,
   said PTC element is placed between the flat portion of said first negative terminal plate and the flat portion of said second negative terminal plate,
   an insulation plate is placed between the flange of said first negative terminal plate and the flange of said second negative terminal plate,
   the opening end of said battery case is bent so as to wrap the upper end of the outer peripheral cylindrical portion of said sealing body, and the bent portion is crimped inward to fasten the flange of said first negative terminal plate, the flange of said second negative terminal plate, and said insulation plate,
   said first negative terminal plate and said second terminal plate have a substantially identical shape,
   the boundary portion of said first negative terminal plate and the boundary portion of said second negative terminal plate each have a hole for discharging a gas out of said battery, and are spaced 0.2 to 1 mm apart.

2. The alkaline battery in accordance with claim 1, wherein said negative electrode contains zinc powder or zinc alloy powder containing 30% by weight or more of particles having a particle size of 75 μm or less.

3. An alkaline battery comprising:
   a power generation element including a positive electrode, a negative electrode, a separator placed between the positive electrode and the negative electrode, and an electrolyte;
   a positive terminal portion electrically connected to said positive electrode;
   a negative terminal portion electrically connected to said negative electrode;
   a battery case that houses said power generation element and also serves as said positive terminal portion; and
   an assembly sealing portion that closes an opening of said battery case,
   wherein said negative electrode contains zinc powder or zinc alloy powder containing 15% by weight or more of particles having a particle size of 75 μm or less as a negative active material,
   wherein said assembly sealing portion includes the negative terminal portion, a negative current collector electrically connected to said negative terminal portion, and a resin sealing body,
   said sealing body includes a central cylindrical portion having a through hole through which said negative current collector is inserted, an outer peripheral cylindrical portion placed between a peripheral edge of said negative terminal portion and an opening end of said battery case, and a connecting portion that connects said central cylindrical portion and said outer peripheral cylindrical portion,
   said connecting portion has a thin portion serving as a safety valve; and
   said negative terminal portion comprises a first negative terminal plate and a second negative terminal plate spaced apart from each other, and a PTC element placed between said first negative terminal plate and said second negative terminal plate,
   wherein said first negative terminal plate and second negative terminal plate each have a flange in a peripheral edge, a flat portion in a central portion, and a boundary portion between said flange and said flat portion,
   said PTC element placed between the flange of said first negative terminal plate and the flange of said second negative terminal plate,
   the opening end of said battery case is bent so as to wrap the upper end of the outer peripheral cylindrical portion of said sealing body, and the bent portion is crimped inward to fasten the flange of said first negative terminal plate, the flange of said second negative terminal plate, and said PTC element,
   said first negative terminal plate and said second terminal plate have a substantially identical shape,
   the boundary portion of said first negative terminal plate and the boundary portion of said second negative terminal plate each have a hole for discharging a gas out of said battery, and are spaced 0.2 to 1 mm apart.

4. The alkaline battery in accordance with claim 3, wherein said negative electrode contains zinc powder or zinc alloy powder containing 30% by weight or more of particles having a particle size of 75 μm or less.

* * * * *